(12) United States Patent
Park

(10) Patent No.: US 12,626,986 B2
(45) Date of Patent: May 12, 2026

(54) BATTERY UNIT WITH SEPARATED HEAT DISSIPATION SPACE

(71) Applicant: Elentec., LTD, Hwaseong-si (KR)

(72) Inventor: Choul Woo Park, Hwasung-si (KR)

(73) Assignee: Elentec., LTD, Hwaseong-si (KR)

( * ) Notice: Subject to any disclaimer, the term of this patent is extended or adjusted under 35 U.S.C. 154(b) by 579 days.

(21) Appl. No.: 18/070,522

(22) Filed: Nov. 29, 2022

(65) Prior Publication Data

US 2023/0411759 A1 Dec. 21, 2023

(30) Foreign Application Priority Data

Jun. 20, 2022 (KR) ........................ 10-2022-0075055

(51) Int. Cl.
| | |
|---|---|
| *H01M 50/24* | (2021.01) |
| *H01M 10/613* | (2014.01) |
| *H01M 50/213* | (2021.01) |
| *H01M 50/291* | (2021.01) |
| *H01M 50/507* | (2021.01) |
| *H01M 50/55* | (2021.01) |

(52) U.S. Cl.
CPC ......... *H01M 50/24* (2021.01); *H01M 10/613* (2015.04); *H01M 50/213* (2021.01); *H01M 50/291* (2021.01); *H01M 50/507* (2021.01); *H01M 50/55* (2021.01)

(58) Field of Classification Search
CPC ............. H01M 50/291; H01M 10/643; H01M 10/6446; H01M 10/6557
See application file for complete search history.

(56) References Cited

U.S. PATENT DOCUMENTS

| | | | | |
|---|---|---|---|---|
| 2006/0164795 A1* | 7/2006 | Jones | ................ | H01M 8/04007 429/153 |
| 2010/0136404 A1* | 6/2010 | Hermann | .............. | H01M 50/24 429/120 |
| 2011/0039142 A1* | 2/2011 | Kwag | ...................... | G01V 3/10 429/99 |
| 2011/0293986 A1* | 12/2011 | Kozu | ................ | H01M 10/6563 429/120 |
| 2011/0293998 A1* | 12/2011 | Sato | .................... | H01M 50/224 439/890 |

FOREIGN PATENT DOCUMENTS

KR 10-1724770 B1 4/2017

* cited by examiner

*Primary Examiner* — Maria Laios
(74) *Attorney, Agent, or Firm* — Revolution IP, PLLC

(57) ABSTRACT

Proposed is a battery unit in which a plurality of cylindrical battery cells, each of which has an upper surface provided with a positive electrode and a negative electrode, are mounted in rows and columns, the battery unit including a lower housing in which a plurality of support recesses which support the plurality of battery cells are formed in rows and columns and a plurality of circulation holes communicating with the outside are formed, an upper housing coupled to the lower housing and having a plurality of straight removal regions; an electrode network provided on an upper surface of the upper housing and provided as a plurality of busbars connected to the positive electrodes of the plurality of battery cells; and a partition plate inserted into a space formed between the plurality of support recesses to divide the plurality of battery cells into predetermined rows and columns.

3 Claims, 3 Drawing Sheets

144

144c

144b

144a

142b

142c

142c

BATTERY UNIT WITH SEPARATED HEAT DISSIPATION SPACE

CROSS REFERENCE TO RELATED APPLICATION

The present application claims priority to Korean Patent Application No. 10-2022-0075055, filed Jun. 20, 2022, the entire contents of which is incorporated herein for all purposes by this reference.

BACKGROUND OF THE INVENTION

Field of the Invention

The present disclosure relates to a battery unit in which a heat dissipation space in a battery cell mounting region is divided.

Description of the Related Art

With the spread of smart devices, the use of rechargeable and reusable secondary batteries is also increasing.

Recently, such secondary batteries have been increasingly applied to electric vehicles (EVs) such as electric cars and electric trains, and an energy storage system (ESS) for industrial and home use.

An ESS is a system technology that increases energy efficiency through charging (storage) and discharging (use) of energy storage devices. The energy storage devices are generally composed of a battery unit in a form in which a plurality of unit lithium-ion battery cells are mounted in a housing and then electrically connected. An example of such a battery unit structure technology is disclosed in Korean Patent No. 10-1724770 (application date: Jun. 4, 2010, publication date: Apr. 3, 2017, hereinafter referred to as the "related art").

In the case of a battery unit, because a plurality of battery cells are densely packed, the battery cells are likely to explode due to an increase in internal temperature, and such explosion may propagate to adjacent battery cells. This requires precise internal temperature control.

However, the related art is provided with a cooling structure for managing the internal temperature, but when any one battery cell explodes due to reduced cooling efficiency or an electrical problem with a specific battery cell, it is difficult to prevent chain explosions of adjacent battery cells and thus is difficult to prevent secondary accidents caused by chain explosions and high repair costs. Also, when a high temperature heat is generated in a specific battery cell, the heat generated may transfer to adjacent battery cells and cause them to heat up, resulting in a reduction in dissipation efficiency for the entire battery unit.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure provides a battery unit capable of preventing, when a battery cell explodes, chain explosions of adjacent battery cells while providing a separated battery cell heat dissipation space.

In order to achieve the above objective, according to one aspect of the present disclosure, there is provided a battery unit in which a plurality of cylindrical battery cells, each of which has an upper surface provided with a positive electrode and a negative electrode, are mounted in rows and columns, the battery unit including: a lower housing in which a plurality of support recesses, each of which supports each of the plurality of battery cells while surrounding a lower surface of the battery cell and a portion of an outer periphery of the battery cell close to the lower surface, are formed in rows and columns and are spaced apart from each other, and a plurality of circulation holes communicating with the outside are formed in a region except for a region the plurality of support recesses are formed; an upper housing coupled to top of the lower housing and having a plurality of straight removal regions in which regions corresponding to the respective upper surfaces of the plurality of battery cells supported in the lower housing are connected to each other; an electrode network provided on an upper surface of the upper housing and provided as a plurality of busbars selectively connected to the respective positive electrodes of the plurality of battery cells exposed through the removal regions; and a partition plate inserted into a space formed between the plurality of support recesses formed in the lower housing to divide the plurality of battery cells inserted into the plurality of support recesses into predetermined rows and columns, wherein a part of a lower portion of the partition plate facing the lower housing may be inserted into each of the circulation holes to divide the circulation holes for each separated region of the plurality of battery cells.

Here, the lower housing may include: a tray part provided in a quadrangular tray shape having an open upper surface having an inner space in which the plurality of battery cells are arranged; and a plurality of rhombic protrusions protruding upward from a bottom surface of the inner space of the tray part.

Furthermore, the plurality of protrusions may be spaced apart from each other at a predetermined interval to form rows and columns, and at least two or more adjacent protrusions may form each of the support recesses, wherein the support recesses may support a specific battery cell and another battery cell adjacent in a row or column direction to the specific battery cell in contact with the portion of the outer periphery of each of the battery cells close to the lower surface thereof in a state in which the battery cells are spaced apart from each other at a regular interval.

Moreover, each of the circulation holes communicating with the outside may be formed in a center of each of the protrusions of the lower housing.

In addition, the partition plate may include: a first division part provided in a plate shape having a length corresponding to a longitudinal length of the inner space of the lower housing and having a thickness corresponding to an interval between the plurality of support recesses in the column direction, having a plurality of first insertion pins formed in a lower portion thereof and each of which is inserted into the circulation hole of each of the protrusions to divide the circulation hole into two regions, disposed in the inner space of the lower housing to be vertical with respect to the lower housing in a state in which the plurality of first insertion pins are inserted into the circulation holes of the protrusions arranged in the row direction, and dividing the plurality of battery cells supported by the lower housing into predetermined rows; and a second division part provided in a plate shape having a length corresponding to the widthwise length of the inner space of the lower housing and having a thickness corresponding to the interval between the plurality of support recesses in the column direction, having a plurality of second insertion pins formed in a lower portion thereof and each of which is inserted into the circulation hole of each of the protrusions to divide the circulation hole into two regions, disposed in the inner space of the lower housing to be vertical with respect to the lower housing and cross the first division part in a state in which the plurality of first insertion pins are inserted into the circulation holes of the protrusions arranged in the column direction, and dividing the plurality of battery cells supported by the lower housing into predetermined columns.

Here, the first division part may have a plurality of first slits formed in an upper portion thereof to be spaced apart from each other at a predetermined interval and into each of which a part of a lower portion of the second division part is inserted, and a first notch formed in a part of the lower portion thereof opposite to a protruding portion of each of the protrusions spaced apart along the row direction of the lower housing.

In addition, the second division part may have a plurality of second slits formed in the lower portion thereof to be spaced apart from each other at positions corresponding to the first slits formed in the first division part, and a second notch formed in a part of the lower portion thereof opposite to a protruding portion of each of the protrusions spaced apart along the column direction of the lower housing.

According to the battery unit with the separated heat dissipation space according to the present disclosure, since the first division part and the second division part of the partition plate are inserted into the space between the plurality of battery cells arranged inside the lower housing in the row and column directions, the plurality of battery cells are divided into predetermined groups along the longitudinal direction and the width direction of the lower housing, and the circulation holes located on the dividing line of the first division part and the second division part are divided into predetermined groups, each group has a separated heat dissipation space. Thus, it is possible to prevent thermal interference between the plurality of battery cells mounted in the battery unit. In addition, even when a specific battery cell explodes, it is possible to induce explosion and heat dissipation to occur toward the removal regions of the upper housing and minimize transfer of impact or heat to the battery cells of an adjacent group, thereby minimizing chain explosions of the battery cells inside the battery unit.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
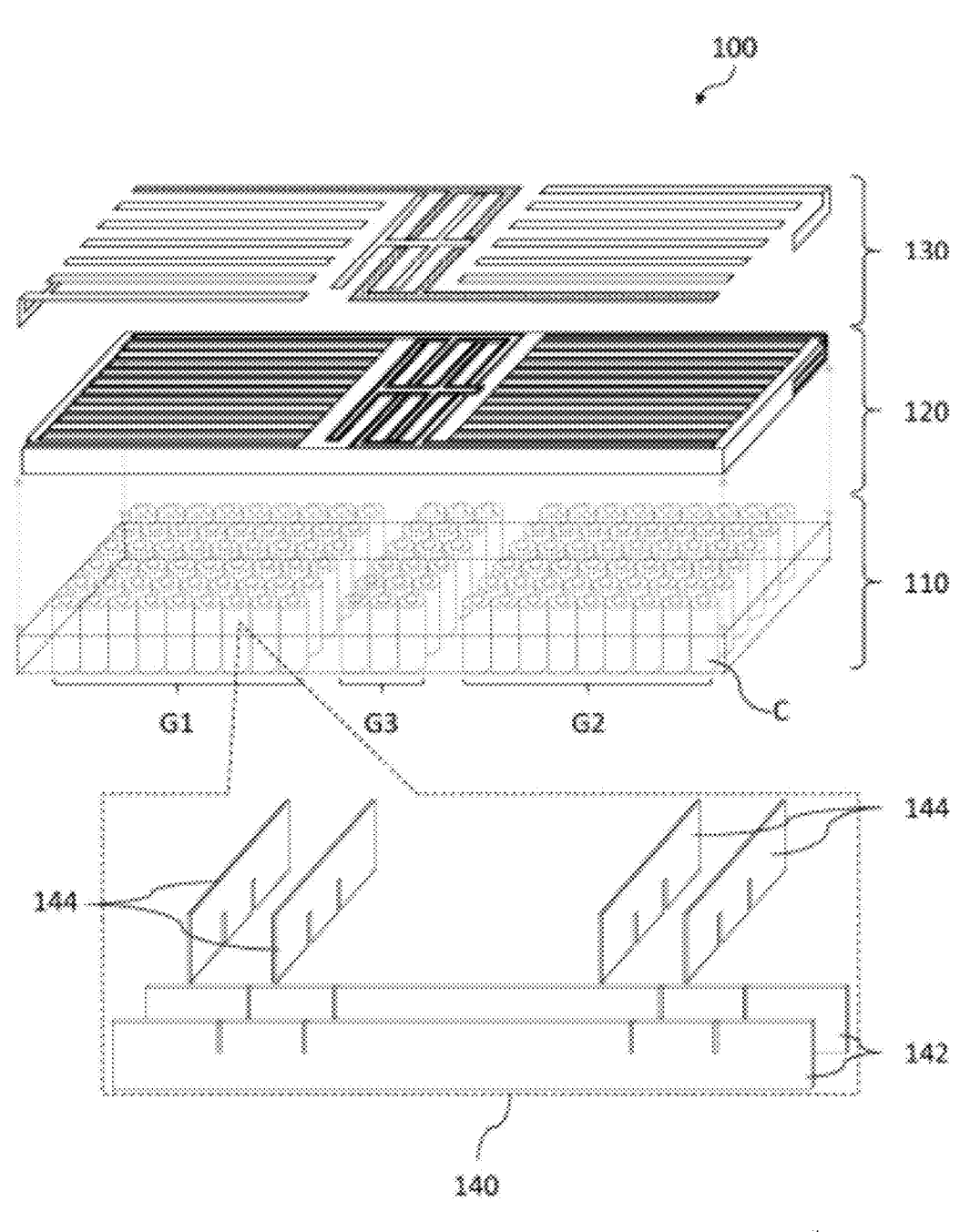
FIG. 1 a view schematically illustrating a battery unit with a separated heat dissipation space according to an exemplary embodiment of the present disclosure.

Hereinafter, an exemplary embodiment of a battery unit with a separated heat dissipation space according to the present disclosure will be described in detail with reference to the accompanying drawings.

Throughout the drawings, like reference numerals refer to like parts. Specific structural and functional descriptions of embodiments of the present disclosure disclosed herein are only for illustrative purposes of the embodiments of the present disclosure. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
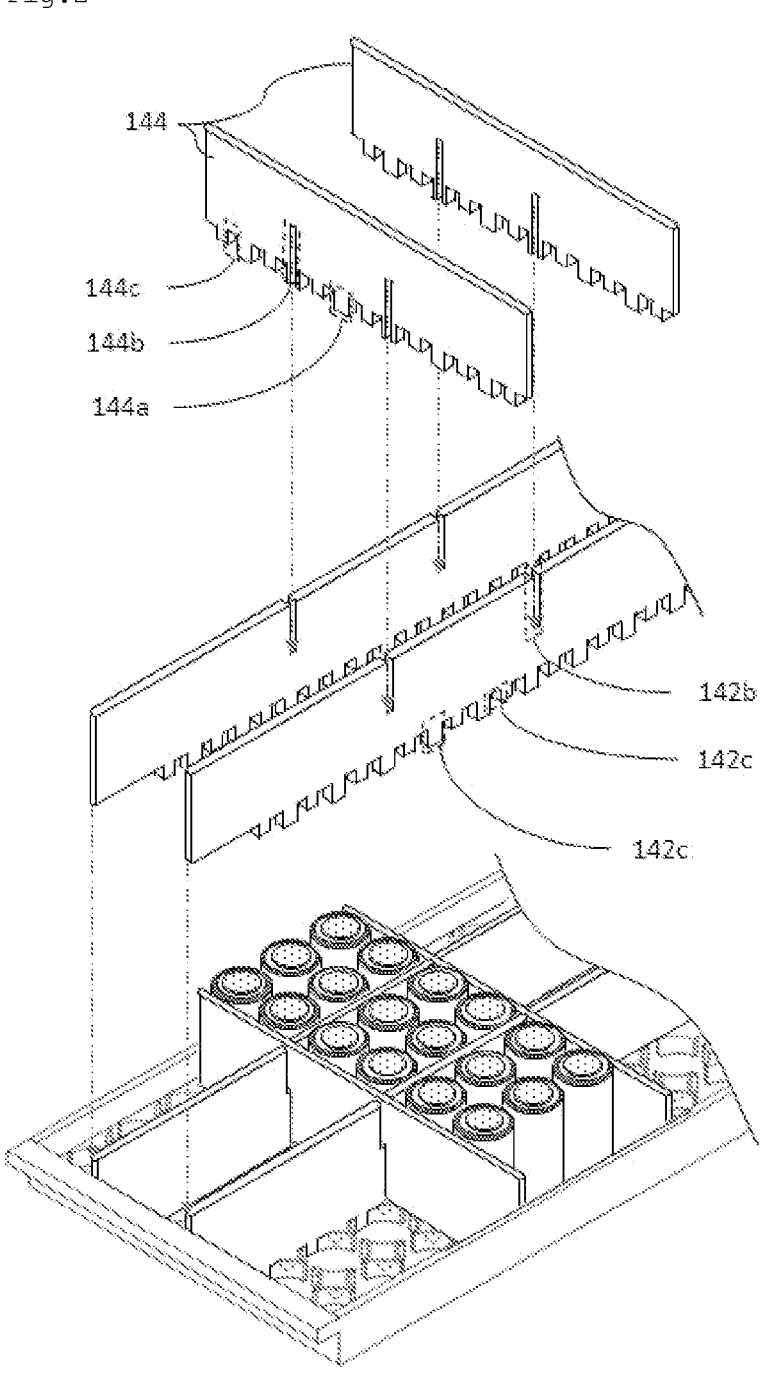
FIG. 2 is a view illustrating a partition plate of the battery unit with the separated heat dissipation space according to the exemplary embodiment of the present disclosure and the arrangement of the partition plate on a lower housing.

FIG. 1 a view schematically illustrating a battery unit 100 with a separated heat dissipation space according to an exemplary embodiment of the present disclosure. FIG. 2 is a view illustrating a partition plate 140 of the battery unit 100 with the separated heat dissipation space according to the exemplary embodiment of the present disclosure and the arrangement of the partition plate 140 on a lower housing 110.

Referring to FIGS. 1 to 2, the battery unit 100 according to the exemplary embodiment of the present disclosure may include a lower housing 110, an upper housing 120, an electrode network 130, and the partition plate 140.

The lower housing 110 may be provided in a quadrangular basket shape having an open upper surface and having an inner space in which a plurality of cylindrical battery cells C, each of which has an upper surface provided with a positive electrode and a negative electrode, are fixedly arranged to form rows and columns in a predetermined group. A plurality of support recesses (not illustrated) for supporting lower portions of the plurality of battery cells C may be formed in a bottom surface of the inner space in which the plurality of battery cells C are fixedly arranged. Here, the support recesses may be formed by a plurality of rhombic protrusions 112 formed on the bottom surface of the lower housing 110 to be continuously spaced apart along the row and column directions. In more detail, the protrusions 112 may be spaced apart from each other at a predetermined interval to form rows and columns, and at least two or more adjacent protrusions 112 may form a support recess for supporting a battery cell C in contact with a portion of the outer periphery of the battery cell C close to a lower surface thereof. The protrusions 112 may have a predetermined thickness in the row and column directions so that a specific battery cell and another battery cell adjacent in the row or column direction to the specific battery cell are supported in a state of being spaced apart from each other at a regular interval. The protrusions 112 may fix the battery cells C in a vertical state from the bottom surface of the lower housing 110. Due to a spaced apart arrangement of the protrusions 112, the support recesses may be provided in a shape in which a circular or square recess relatively depressed compared to a protruding shape of the protrusions 112 is repeatedly formed in the bottom surface of the lower housing 110 in the row and column directions of the lower housing 110. The support recesses may be formed at a predetermined interval so that the battery cells C are spaced apart from each other at a predetermined interval. At this time, a circulation hole 112*a* formed through a lower portion of the lower housing 110 and through which outside air is introduced may be formed in the center of each of the protrusions 112. Here, the circulation hole 112*a* may be formed to have a diameter larger than the thickness formed by first and second division parts 142 and 144 of the partition plate 140 which will be described later, and smaller than the length and width formed by the protrusions 112.

The plurality of battery cells C fixedly arranged in the lower housing 110 may form a plurality of cell groups G1, G2, and G3 in each of which a predetermined number of battery cells C form rows and columns. The plurality of battery cells C may be fixed in such a manner that the cell groups G1, G2, and G3 are spaced apart from each other at a predetermined interval along the longitudinal direction of the lower housing 110. At this time, the cell groups G1, G2, and G3 formed by the plurality of battery cells C may be composed of a first cell group G1, a second cell group G2, and a third cell group G3 arranged along the longitudinal direction of the lower housing 110. The first cell group G1 may include a plurality of battery cells C arranged to form rows and columns, and may be disposed in a first region of the inner space of the lower housing 110. The second cell group G2 may include a plurality of battery cells C of the same number as those of the first cell group G1 arranged to form rows and columns, and may be disposed between the first cell group G1 and the second cell group G2. The third cell group G3 may include a plurality of battery cells C of a smaller number than those of the first cell group G1 or the second cell group G2 arranged to form rows and columns, and may be disposed in a second region of the inner space of the lower housing 110 opposite to the first region in which the first cell group G1 is disposed. The arrangement of the first, second, and third cell groups G1, G2, and G3 may be achieved in such a manner that the battery cells C forming a single row or column are connected to each other in parallel, with the positive electrodes thereof being joined to the electrode network 130 in the form of a plurality of separated busbars of various shapes, and the parallel-connected battery cells C in each row or column are connected in series with the parallel-connected battery cells C in another adjacent row or column. The arrangement of the first, second, and third cell groups G1, G2, and G3 may be determined differently depending on the voltage and current flowing through opposite ends of the electrode network 130 connecting the plurality of battery cells C.

The upper housing 120 may be coupled to the lower housing 110 to cover the open upper surface of the lower housing 110. At this time, the upper housing 120 may be coupled to the open upper surface of the lower housing 110, thereby forming a rectangular parallelepiped shape conforming to the shape of the battery unit 100 according to the exemplary embodiment of the present disclosure. The upper housing 120 may be provided in a shape in which a region of an upper portion thereof corresponding to the upper surface of each of the battery cells C on which the positive electrode is disposed is removed. Each removal region may be connected to another adjacent removal region to form a straight line. The upper housing 120 may be provided in a shape in which a region corresponding to an imaginary straight line that connects the upper surfaces of a row of battery cells C forming each of the first cell group G1 and the second cell group G2 is removed, and a region corresponding to an imaginary straight line that connects the upper surfaces of a column of battery cells C forming the third cell group G3 is removed. The removal regions of the upper housing 120 may be provided to allow, when the electrode network 130 which will be described later is disposed on the upper surface of the upper housing 120, the positive electrodes of the plurality of battery cells C arranged in an inner space formed by the lower housing 110 and the upper housing 120 to be joined and connected to a plurality of busbars forming the electrode network 130. The removal regions of the upper housing 120 may be used to dissipate heat generated from the plurality of battery cells C arranged in the inner space formed by the lower housing 110 and the upper housing 120 to the outside. At this time, outside air may be introduced through the respective circulation holes 112*a* formed in the protrusions 112 of the lower housing 110 and heated air in the inner space (battery cell mounting region) formed by the lower housing 110 and the upper housing 120 coupled to each other may be discharged to the outside through the removal regions formed on the upper surface of the upper housing 120. In other words, natural circulation air cooling may be achieved. Meanwhile, a sensing PCB (not illustrated) that selectively conducts with the plurality of separated busbars of the electrode network 130 and outputs an electrical signal for each connection section of the electrode network 130 to which the plurality of battery cells C are connected may be coupled by a separate coupling means to the center of the upper surface of the upper housing 120 corresponding to the region in which the third cell group G3 is disposed.

The electrode network 130 may be disposed in a region of the upper surface of the upper housing 120 except for the removal regions. The electrode network 130 may include a first busbar (not illustrated), a second busbar (not illustrated), and a third busbar (not illustrated). Here, the first busbar may be provided as a pair of first busbars. The first busbars may be arranged between a plurality of straight removal regions formed in the region corresponding to each of the first cell group G1 and the second cell group G2 of the upper housing 120. The second busbar may include a pair of separated busbars (not illustrated) and a connection busbar (not illustrated). Here, among the pair of separated busbars, one separated busbar may be disposed in any one of the outermost regions of the plurality of straight removal regions formed in the region corresponding to the first cell group G1, and any one or more of a plurality of separated removal regions extending from the any one of the outermost regions and formed in the region corresponding to the third cell group G3; and the remaining separated busbar may be disposed at a position diagonal and symmetrical with the position of the one separation busbar, that is, in any one of the outermost regions of the plurality of straight removal regions formed in the region corresponding to the second cell group G2, and any one or more of the plurality of separated removal regions extending from the any one of the outermost regions and formed in the region corresponding to the third cell group G3. The connection busbar may be disposed in the region in which no separated busbars are arranged among the regions adjacent to the separated removal regions formed in the region corresponding to the third cell group G3. The third busbar may be provided as a pair of third busbars. The third busbars may be respectively formed in the outermost region of the plurality of straight removal regions formed in the region corresponding to the first cell group G1 and the outermost region of the plurality of straight removal regions formed in the region corresponding to the second cell group G2, the outermost regions being not connected to the first and second busbars. The third busbars may extend in the lateral direction of the upper housing 110.

Figure 3:
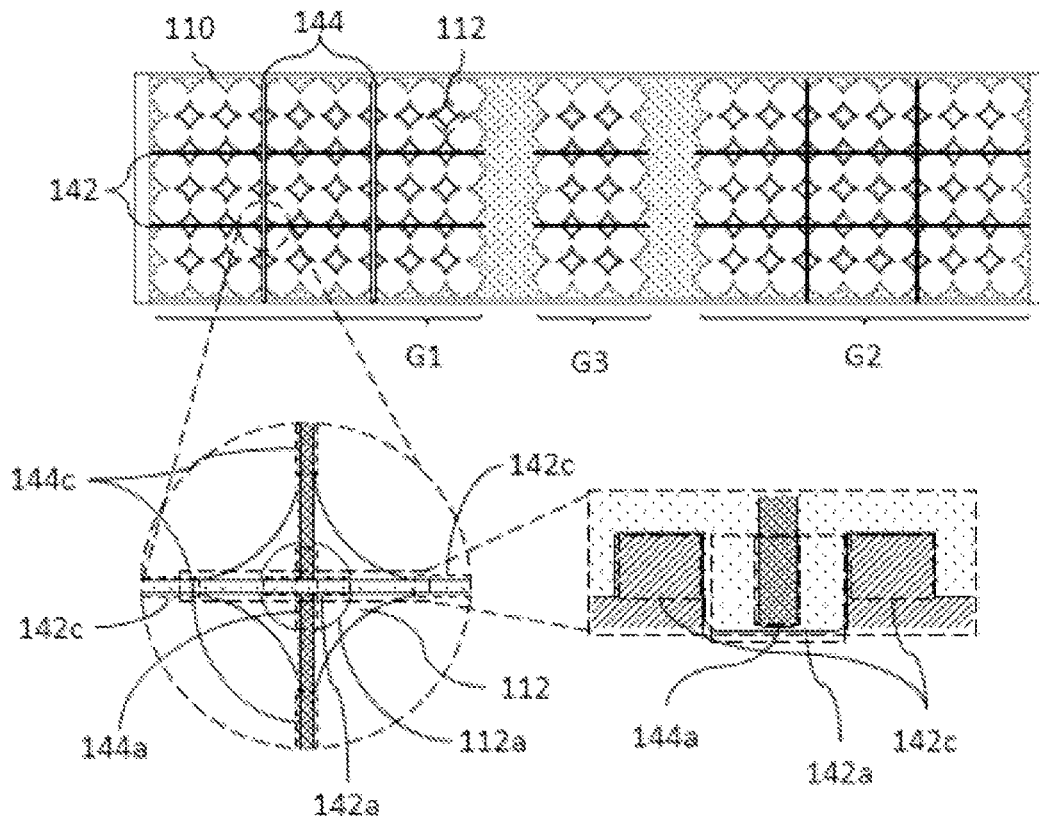
FIG. 3 is a view visually illustrating an example in which the heat dissipation space is separated for each battery cell arrangement section of the lower housing by the partition plate of the battery unit with the separated heat dissipation space according to the exemplary embodiment of the present disclosure.

FIG. 3 is a view visually illustrating an example in which the heat dissipation space is separated for each battery cell arrangement section of the lower housing 110 by the partition plate 140 of the battery unit 100 with the separated heat dissipation space according to the exemplary embodiment of the present disclosure.

Referring to FIGS. 1 to 3, the partition plate 140 may be inserted into the space formed by the plurality of support recesses formed in the lower housing 110 to divide the plurality of battery cells C inserted into the plurality of support recesses into predetermined rows and columns. The partition plate 140 may include the first division part 142 and the second division part 144.

The first division part 142 may be provided in a plate shape having a length corresponding to the longitudinal length of the inner space of the lower housing 110 and having a thickness corresponding to the interval between the plurality of support recesses in the column direction. The first division part 142 may have a plurality of first insertion pins 142a formed in a lower portion thereof, and each of which is inserted into the circulation hole 112a of each of the protrusions 112 to divide the circulation hole 112a into two regions. The first division part 142 may be disposed in the inner space of the lower housing 110 to be vertical with respect to the lower housing 110 in a state in which the plurality of first insertion pins 142a are inserted into the circulation holes 112a of the protrusions 112 arranged in the row direction, and may divide the plurality of battery cells C supported by the lower housing 110 into predetermined rows. Here, as illustrated in FIG. 2, the first division part 142 may have a plurality of first slits 142b formed in an upper portion thereof to be spaced apart from each other at a predetermined interval and into each of which a part of a lower portion of a second division part 144 which will be described later is inserted in a cross shape, and a first notch 142c formed in a part of the lower portion thereof opposite to a protruding portion of each of the protrusions 112 spaced apart along the row direction of the lower housing 110. At this time, the first slits 142b may be formed to a depth corresponding to half of the height of the first division part 142. The purpose of the depth of the first slits 142b is to allow, when first division part 142 and the second division part 144 are coupled to cross each other in a state in which a second slit 144b formed in a lower portion of the second division part 144 which will be described later is fitted in each of the first slits 142b, the first division part 142 and the second division part 144 coupled to each other to have a predetermined height. The second slit 144b formed in the lower portion of the second division part 144 which will be described later may also be formed to have a height corresponding to the depth of the first spits 142b. The first notch 142c may be formed on each lateral side of each of the first insertion pins 142a. Thus, when the first insertion pins 142a are respectively inserted into the circulation holes 112a of the protrusions 112 spaced apart along the row direction of the lower housing 110, the first division part 142 may come into close contact with protruding upper surfaces and lateral surfaces of the protrusions 112 and the bottom surface of the lower housing 110 while dividing each of the circulation holes 112a into two regions. With such arrangement and coupling of the first division part 142 on the lower housing 110, the plurality of battery cells C may be divided into predetermined row groups, and an independent heat dissipation space may be formed in each group.

The second division part 144 may be provided in a plate shape having a length corresponding to the widthwise length of the inner space of the lower housing 110 and having a thickness corresponding to the interval between the plurality of support recesses in the column direction. The second division part 144 may have a plurality of second insertion pins 144a formed in a lower portion thereof, and each of which is inserted into the circulation hole 112a of each of the protrusions 112 to divide the circulation hole 112a into two regions. The second division part 144 may be disposed in the inner space of the lower housing 110 to be vertical with respect to the lower housing 110 and cross the first division part 142 in a state in which the plurality of first insertion pins 142a are inserted into the circulation holes 112a of the protrusions 112 arranged in the column direction, and may divide the plurality of battery cells C supported by the lower housing 110 into predetermined columns. Here, as illustrated in FIG. 2, the second division part 144 may have a plurality of second slits 144b formed in the lower portion thereof to be spaced apart from each other at positions corresponding to the first slits 142b formed in the first division part 142, and a second notch 144c formed in a part of the lower portion thereof opposite to a protruding portion of each of the protrusions 112 spaced apart along the column direction of the lower housing 110. Since the second division part 144 is disposed on the bottom surface of the lower housing 110 to cross the first division part 142 in a state in which the second slits 144b and the first slits 142b are fitted together, the row groups divided by the first division part 142 are divided again into column groups, and the heat dissipation space formed by the first division part 142 may be divided again for each group.

Also, the space between the protrusions 112 on the dividing line may be closed by the first and second notches 142c and 144c of the first division part 142 and the second division part 144, so that the first division part 142 and the second division part 144 may divide the plurality of battery cells C supported by the lower housing 110 into predetermined groups. A separated space for each group may be isolated from an adjacent divided space in the lateral direction, a predetermined air circulation section formed by the circulation holes 112a of the lower housing 110 and the removal regions of the upper housing 120 may be divided for each separated space. Thus, even when the temperature of the battery cells C in a specific group increases, it is possible to minimize thermal interference with an adjacent group. Also, even when a specific battery cell C explodes, the first division part 142 and the second division part 144 may induce explosion and heat dissipation to occur toward the removal regions of the upper housing 144 and prevent impact or heat from being transferred to the battery cells C of an adjacent group, thereby preventing chain explosions of the battery cells C of the adjacent group.

According to the battery unit with the separated heat dissipation space according to the present disclosure, since the first division part and the second division part of the partition plate are inserted into the space between the plurality of battery cells arranged inside the lower housing in the row and column directions, the plurality of battery cells are divided into predetermined groups along the longitudinal direction and the width direction of the lower housing, and the circulation holes located on the dividing line of the first division part and the second division part are divided into predetermined groups, each group has a separated heat dissipation space. Thus, it is possible to prevent thermal interference between the plurality of battery cells mounted in the battery unit. In addition, even when a specific battery cell explodes, it is possible to induce explosion and heat dissipation to occur toward the removal regions of the upper housing and minimize transfer of impact or heat to the battery cells of an adjacent group, thereby minimizing chain explosions of the battery cells inside the battery unit.

Although a preferred embodiment of the present disclosure has been described for illustrative purposes, those skilled in the art will appreciate that various modifications, additions, and substitutions are possible, without departing from the scope and spirit of the present disclosure as disclosed in the accompanying claims.

What is claimed is:

1. A battery unit in which a plurality of cylindrical battery cells, each of which has an upper surface provided with a positive electrode and a negative electrode, are mounted in rows and columns, the battery unit comprising:

a lower housing in which a plurality of support recesses, each of which supports each of the plurality of battery cells while surrounding a lower surface of the battery cell and a portion of an outer periphery of the battery cell close to the lower surface, are formed in rows and columns and are spaced apart from each other, and a plurality of circulation holes communicating with the outside are formed in a region except for a region the plurality of support recesses are formed;

an upper housing coupled to top of the lower housing and having a plurality of straight removal regions in which regions corresponding to the respective upper surfaces of the plurality of battery cells supported in the lower housing are connected to each other;

an electrode network provided on an upper surface of the upper housing and provided as a plurality of busbars selectively connected to the respective positive electrodes of the plurality of battery cells exposed through the removal regions; and a partition plate inserted into a space formed between the plurality of support recesses formed in the lower housing to divide the plurality of battery cells inserted into the plurality of support recesses into predetermined rows and columns, wherein a part of a lower portion of the partition plate facing the lower housing is inserted into each of the circulation holes to divide the circulation holes for each separated region of the plurality of battery cells, wherein the lower housing comprises:

a tray part provided in a quadrangular tray shape having an open upper surface having an inner space in which the plurality of battery cells are arranged; and a plurality of rhombic protrusions protruding upward from a bottom surface of the inner space of the tray part, wherein the plurality of protrusions are spaced apart from each other at a predetermined interval to form rows and columns, and at least two or more adjacent protrusions form each of the support recesses, wherein the support recesses support a specific battery cell and another battery cell adjacent in a row or column direction to the specific battery cell in contact with the portion of the outer periphery of each of the battery cells close to the lower surface thereof in a state in which the battery cells are spaced apart from each other at a regular interval, wherein each of the circulation holes communicating with the outside is formed in a center of each of the protrusions of the lower housing, wherein the partition plate comprises:

a first division part provided in a plate shape having a length corresponding to a longitudinal length of the inner space of the lower housing and having a thickness corresponding to an interval between the plurality of support recesses in the column direction, having a plurality of first insertion pins formed in a lower portion thereof and each of which is inserted into the circulation hole of each of the protrusions to divide the circulation hole into two regions, disposed in the inner space of the lower housing to be vertical with respect to the lower housing in a state in which the plurality of first insertion pins are inserted into the circulation holes of the protrusions arranged in the row direction, and dividing the plurality of battery cells supported by the lower housing into predetermined rows; and a second division part provided in a plate shape having a length corresponding to the widthwise length of the inner space of the lower housing and having a thickness corresponding to the interval between the plurality of support recesses in the column direction, having a plurality of second insertion pins formed in a lower portion thereof and each of which is inserted into the circulation hole of each of the protrusions to divide the circulation hole into two regions, disposed in the inner space of the lower housing to be vertical with respect to the lower housing and cross the first division part in a state in which the plurality of first insertion pins are inserted into the circulation holes of the protrusions arranged in the column direction, and dividing the plurality of battery cells supported by the lower housing into predetermined columns.

2. The battery unit of claim 1, wherein the first division part has a plurality of first slits formed in an upper portion thereof to be spaced apart from each other at a predetermined interval and into each of which a part of a lower portion of the second division part is inserted, and a first notch formed in a part of the lower portion thereof opposite to a protruding portion of each of the protrusions spaced apart along the row direction of the lower housing.

3. The battery unit of claim 2, wherein the second division part has a plurality of second slits formed in the lower portion thereof to be spaced apart from each other at positions corresponding to the first slits formed in the first division part, and a second notch formed in a part of the lower portion thereof opposite to a protruding portion of each of the protrusions spaced apart along the column direction of the lower housing.

* * * * *